United States Patent [19]

Peterson

[11] 4,376,606
[45] Mar. 15, 1983

[54] LOAD-DISTRIBUTING WASHER FOR PLASTIC MEMBERS

[75] Inventor: Francis C. Peterson, St. Charles, Ill.

[73] Assignee: Illinois Tool Works Inc., Chicago, Ill.

[21] Appl. No.: 188,638

[22] Filed: Sep. 19, 1980

[51] Int. Cl.³ .......................................... F16B 43/00
[52] U.S. Cl. ............................ 411/155; 301/9 AN; 403/408; 411/531
[58] Field of Search ............... 411/531, 544, 155, 156; 301/9 AN, 9 DN, 9 R, 9 SB, 30; 403/408, 405

[56] References Cited

U.S. PATENT DOCUMENTS

| | | | |
|---|---|---|---|
| 1,399,720 | 12/1921 | Baker | 301/9 AN |
| 1,640,650 | 8/1927 | Ehrhardt | 411/531 |
| 1,766,099 | 6/1930 | Booth | 301/9 |
| 1,780,839 | 11/1930 | Pewter . | |
| 1,828,340 | 10/1931 | Reed | 301/9 |
| 1,886,535 | 11/1932 | Eksergian | 301/9 AN |
| 2,092,682 | 9/1937 | Roske | 411/531 |
| 2,352,487 | 6/1944 | McNamara, Jr. | 301/9 |
| 2,381,315 | 8/1945 | Smith et al. . | |
| 2,383,808 | 8/1945 | MacLean, Jr. | 411/155 X |
| 2,446,857 | 8/1948 | Snyder . | |
| 2,592,028 | 4/1952 | Hammitt et al. . | |
| 2,645,317 | 7/1953 | Staaf . | |
| 3,025,109 | 3/1962 | Martin | 301/9 |
| 3,315,720 | 4/1967 | Gutshall | 411/156 X |
| 3,664,708 | 5/1972 | Verdier | 301/9 |
| 3,749,450 | 7/1973 | Sewter et al. | 301/9 |
| 3,759,576 | 9/1973 | Richter | 301/9 |
| 3,829,163 | 8/1974 | Hans | 301/9 |
| 3,873,162 | 3/1975 | Segawa | 301/30 |
| 4,289,060 | 9/1981 | Emmett | 411/544 X |

FOREIGN PATENT DOCUMENTS

| | | | |
|---|---|---|---|
| 146117 | 4/1952 | Australia | 411/531 |
| 2026332 | 12/1970 | Fed. Rep. of Germany | 301/9 DN |
| 884660 | 5/1943 | France | 411/531 |
| 307076 | 7/1955 | Switzerland | 411/155 |
| 534439 | 3/1941 | United Kingdom | 411/531 |

*Primary Examiner*—Ramon S. Britts
*Attorney, Agent, or Firm*—Donald D. Mondul; Thomas W. Buckman

[57] ABSTRACT

A specially designed washer for attaching a plastic member to a metal substrate. The washer has a generally polygonal configuration with a metal-substrate-engaging member which projects through the plastic from an off-center location. This member provides some dissipation of the clamp load through a metal-to-metal contact path through the plastic and also acts as a pivot point for the washer to transfer another component outwardly from the aperture in the plastic and distribute it over a wide surface area to reduce plastic creep and eliminate loosening of the joint. A crowning of the washer body dissipates additional clamp loading from the resulting spring forces.

6 Claims, 8 Drawing Figures

LOAD-DISTRIBUTING WASHER FOR PLASTIC MEMBERS

BACKGROUND AND SUMMARY OF THE INVENTION

The present invention is directed to several washer configurations useful in clamping plastic members to a metal substrate.

In recent years, technology has developed plastics with vastly improved strength characteristics. Accordingly, plastics have found an ever increasing number of industrial uses. The appliance and automotive industries, for example, are increasing their use of plastics in an effort to reduce the overall product weight.

One perplexing problem facing plastics users is how to fasten it. When subjected to normal clamp loading particularly where the joint may be subject to heat caused by friction or the like, most plastics will "cold flow" or "creep", that is, the plastic will move laterally under load to avoid the compression, thereby loosening the joint. Such fastening problems have prevented, until now, plastics from being utilized in applications where the plastic needs firm clamping for lateral stability such as plastic wheels, for example.

One solution to the plastic clamping problem is described in co-owned U.S. Pat. No. 4,193,434. The fastener-washer assembly disclosed there has proven highly successful in solving many plastic clamping problems in a wide variety of applications. However, in instances where it is necessary to subject the plastic member to greater clamp loading or where special constraints will not permit a washer of that type to be used, alternate devices are needed.

The present invention provides devices to meet those needs. In each embodiment, a polygonal washer forms a large surface area over which to distribute the clamp load. A projecting member has sufficient length to extend through the thickness of the plastic to engage a metallic substrate therebeneath. Therefore, a portion of the clamp load is absorbed in a metal-to-metal connection. Further, various spring characteristics are built into the washer which require additional force to overcome. Lastly, this metal-substrate-engaging member is non-centrally or asymmetrically positioned so that the washer will pivot thereabout distributing the remainder of the clamp load over a broad surface area which is positioned well away from the bolt-receiving hole in the plastic.

Other characteristics, features and advantages of the present invention will become apparent by reading the following specification in conjunction with the accompanying drawings.

DETAILED DESCRIPTION OF THE PREFERRED EMBODIMENTS

Figure 1:
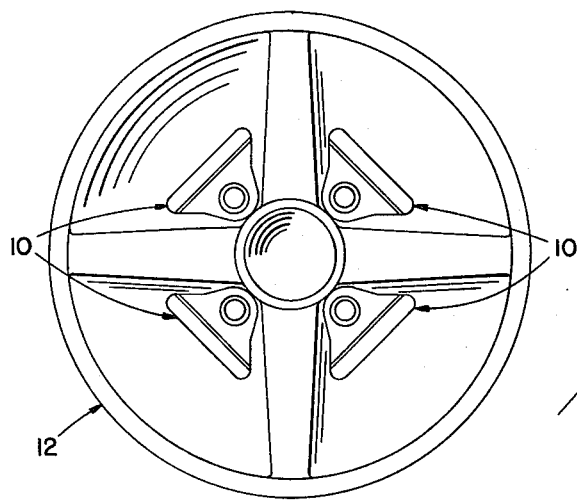
FIG. 1 is a schematic top view showing the washer being used to clamp a plastic wheel.

One embodiment of the washer of the present invention is shown generally at 10. In FIG. 1, a potential use of the washer of the present invention is depicted, the washer being shown used with a plastic wheel 12. Although depicted as used with a plastic wheel, it will be appreciated that the washer of the present invention can be used to attach any comparatively soft material which is subject to plastic creep to any harder substrate which is not. Further, the washer can be made from any material, although some type of spring steel is preferred.

Figure 2:
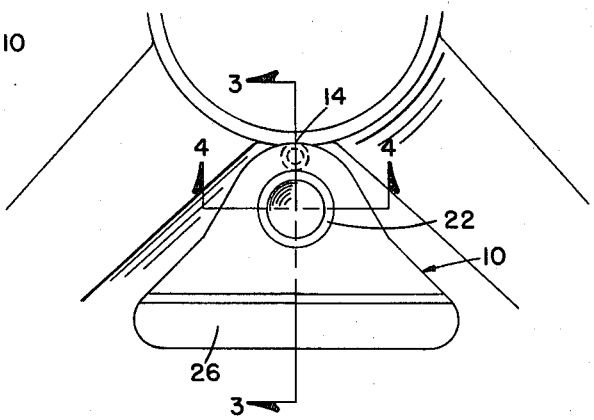
FIG. 2 is an enlargement of the washer shown in FIG. 1.
Figure 3:
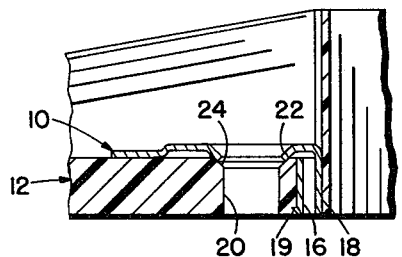
FIG. 3 is a partial cross-section of the washer shown in FIG. 2 as seen from line 3—3.
Figure 4:
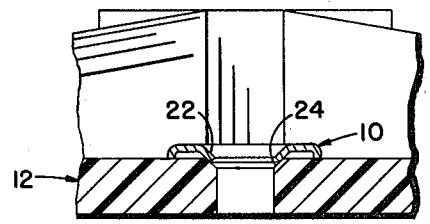
FIG. 4 is a partial cross-sectional view of the washer shown in FIG. 2 as seen from line 4—4.

The first embodiment is depicted in greater detail in FIGS. 2-4. Washer 10 is shown as having a generally triangular configuration but it is contemplated that other polygonal shapes (square, rectangular, pentagonal, elliptical, etc.) may be effective as well. Adjacent one apex 14 of the washer is an integrally formed lug 16. This lug is received and, preferably, press fit, in a hole 18 through wheel 12. A locking projection 19 is configured to permit entry into hole 18 but inhibit withdrawal. Hole 18 is positioned adjacent the bolt-receiving aperture 20 in the wheel 12. An axially extending portion or collar 22 projects within the countersink 24 of aperture 20.

As shown in FIG. 3, the washer is shown as it would appear in the fully loaded position, with surface 26 bearing against the wheel. In actuality, in an unloaded condition, washer 10 would assume a slightly more arcuate configuration with washer 10 sprung outwardly with respect to the lug 16 and surface 26 canted toward the surface of the wheel slightly. Further, the collar 22 may have a shallower angle than the countersink 24 and the lug nut. With this configuration, additional clamp loading can be dissipated as some force will be necessary to overcome the spring characteristics of this arcuate shape and to deflect the collar downwardly. Additionally, as shown in FIG. 4, the washer has a slight bow across axially extending portion 22. Flattening of this bowed portion will further dissipate some of the clamping forces.

In use, four washers are preassembled to wheel 12 by press fitting lugs 16 into holes 18 locking projection 19 serving to prevent undesired removal. In this preassembled condition, the upper periphery (as shown in FIG. 3) of collar portion 22 will be received within countersink 24 to position and align the washers and the bottommost portion of surface 26 will lightly touch the wheel 12. The wheel is then positioned on the lug bolts (not shown) and lug nuts (also not shown) used to affix the wheel in position. As the lug nuts are tightened, a portion of the clamp load is transmitted from the lug nut through the metal-substrate-engaging member directly to the metal substrate. Another portion of the clamp load is dissapted in distorting the collar and flattening the washer, both laterally and longitudinally, into its load-bearing position. The last portion of the clamp load is dissipated over a comparitively large surface area of the wheel 12 as the washer pivots about lug 18 to bring washer surface 26 into engagement with the wheel. This last component of the clamp load is sufficient to provide lateral stability to the wheel but is spread over a large enough surface so that substantial loosening of the joint, even during rigorous thermal cycling tests, is avoided.

Figure 5:
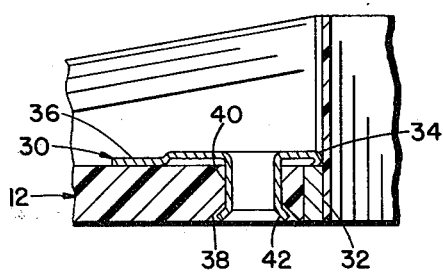
FIG. 5 is a partial cross-section similar to FIG. 2 of a second embodiment.
Figure 6:
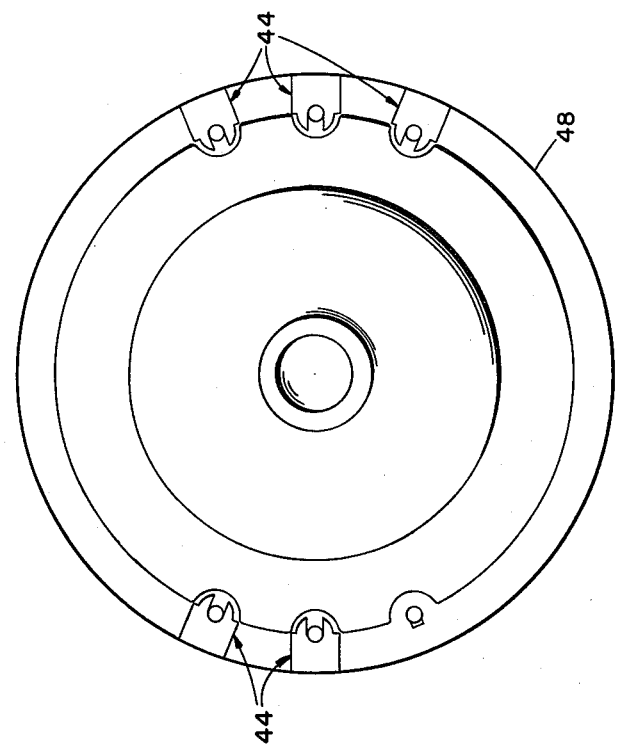
FIG. 6 is a schematic top view showing a third embodiment of the washer used to attach a plastic transmission housing.
Figure 7:
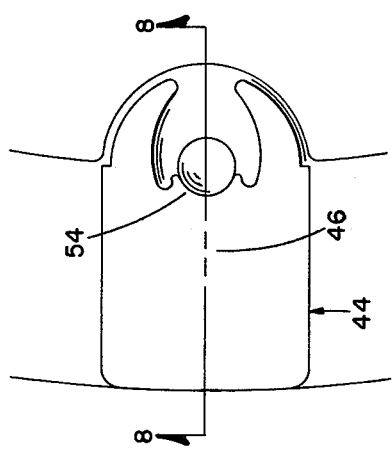
FIG. 7 is an enlargement of a top view of one of the washers of the FIG. 6 embodiment.
Figure 8:
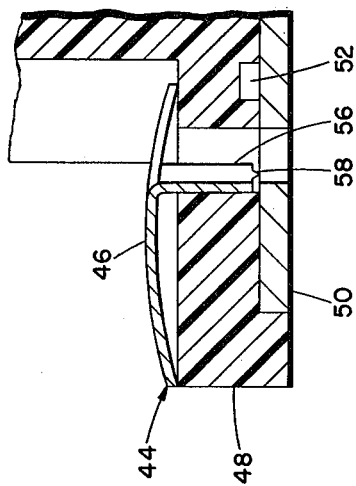
FIG. 8 is a partial cross-sectional view taken along line 8—8 in FIG. 7.

A second embodiment of the washer of the present invention is depicted generally at 30 in FIG. 5. In this embodiment, the metal-substrate-engaging member comprises a separate solid pin 32 which is press fit in the hole 18 in wheel 12. This pin can be retained in the hole in any desired manner. A flange 34 of the washer engages the upper surface of the pin 32 to transfer a portion of the clamp load directly to the metal substrate and, again, cause the washer body to pivot to transfer the load to washer surface 36 spaced well outwardly from the periphery of lug-receiving aperture 20. In this embodiment, the countersink 38 is provided on the inner face of the wheel to provide space so that the edge 42 of extending portion or collar 40 can be flared. This is necessary to replace the retaining function provided by lug 16 in the previous embodiment. The flaring can be performed as an assembly step or, if the conventional lug bolts are replaced by ones having a taper above the threads, flaring will occur as a natural consequence of the initial mounting of the wheel.

The washer body is crowned in the unloaded condition as in the previous embodiment. For this reason, collar 40 is long enough to provide a space between flared edge 42 and countersink 38. In the dismounted position of the wheel, the washer may relax to its crowned condition without pushing pin 32 out of hole 18 or collar 40 trying to work its way out of aperture 20. The three way load dissipation available in the previous embodiment is also a functional characteristic of this embodiment, as well.

While the present invention has been described in conjunction with several preferred embodiments, various changes, modifications and alterations of the washers depicted will become apparent following a reading of the foregoing specification. Accordingly it is intended that all such changes, modifications and alterations as come within the scope of the appended claims be considered part of the present invention.

I claim:

1. A device for clamping a resilient plastic member which has a plurality of bolt-receiving apertures to a metal substrate, said device comprising a resiliently deformable, generally polygonally shaped washer, a hole extending through the washer which has a diameter that is at least equal to that of the bolt, an extending collar portion surrounding at least a portion of the hole and projecting generally axially of the washer, said collar portion being received in at least part of one of the bolt-receiving apertures of the plastic member, a metal-substrate-engaging member located adjacent said hole, said metal-substrate-engaging member providing metal-to-metal clamp loading through the plastic member and being non-centrally located so as to act as a pivot for the washer whereby a large portion of the washer body is brought into engagement with the plastic member to distribute the clamping load over a broad surface to thereby substantially reduce joint loosening caused by plastic creep.

2. The device of claim 1 wherein the metal-substrate-engaging member comprises a lug which is integrally formed with the washer and projects through a second aperture in the plastic member.

3. The device of claim 2 wherein the integral metal-substrate-engaging member is located at an apex of the polygonal washer.

4. The device of claim 1 wherein the metal-substrate-engaging member comprises a separate pin which is force fit into a second aperture in the wheel.

5. The device of claim 4 wherein a flange of the washer engages said pin to transmit the pivotal forces to the washer.

6. The device of claim 1 wherein the collar portion has a length which is substantially equal to the thickness of the plastic member.

* * * * *